INVENTORS
MAURICE C. FERRE
NICK A. SCHUSTER
FRANCIS F. SEGESMAN
BY
THEIR ATTORNEY

INVENTORS
MAURICE C. FERRE
NICK A. SCHUSTER
FRANCIS F. SEGESMAN

THEIR ATTORNEY

March 31, 1959   M. C. FERRE ET AL   2,880,389
ELECTRICAL RESISTIVITY WELL LOGGING
Filed Sept. 10, 1954   5 Sheets-Sheet 3

INVENTORS
MAURICE C. FERRE
NICK A. SCHUSTER
FRANCIS F. SEGESMAN
BY
William R. Sherman
THEIR ATTORNEY

INVENTORS
MAURICE C. FERRE
NICK A. SCHUSTER
FRANCIS F. SEGESMAN

THEIR ATTORNEY

United States Patent Office

2,880,389
Patented Mar. 31, 1959

2,880,389

ELECTRICAL RESISTIVITY WELL LOGGING

Maurice C. Ferre, Nick A. Schuster, and Francis F. Segesman, Ridgefield, Conn., assignors, by mesne assignments, to Schlumberger Well Surveying Corporation, Houston, Tex., a corporation of Texas Application September 10, 1954, Serial No. 455,133

12 Claims. (Cl. 324—1)

The present invention relates to electrical well logging and more particularly to new and improved methods and apparatus for obtaining a plurality of simultaneous electrical resistivity measurements in earth formations surrounding a well or bore hole.

Useful geophysical information regarding earth formations surrounding a bore hole is now commonly obtained by measurement of the electrical resistivity encountered by survey current introduced into a bore hole by means of suitable well logging apparatus. Non-homogeneities in these earth formations created by the well drilling processes conventionally employed add factors to this information which are difficult to isolate by resistivity measurements of only a single characteristic. Two or more resistivity measurements of different characteristics in which such factors as true bed resistivity and invaded zone resistivity have distinguishable effects make possible an isolation of these factors for the detection of such a formation property as permeability. Differing resistivity measurements are now commonly secured by successively running through a bore hole logging apparatuses of as many specialized designs as there are resistivity measurements to be recorded. In consequence, it would be desirable to combine in one or a few apparatuses the many specialized characteristics now requiring separate logging apparatuses. By such a combination of characteristics, a better correlation of different resistivity values as a function of formation depths is facilitated and less drilling rig time is required for completion of survey. Moreover, an advantage would lie in reducing the amount of capital equipment required for a complete survey if components duplicated in the several specialized types of logging apparatus could be replaced by single, multi-purpose components.

Accordingly, it is an object of this invention to realize these advantages obtainable with simultaneous measurements of differing formation resistivities by providing new and improved well logging methods and apparatus for making such multiple measurements.

Another object of the invention is to obtain a plurality of distinctive resistivity measurements in earth formations by well logging methods and apparatus operating on a time-sharing basis.

Yet another object of the invention is to provide for simultaneous measurements in earth formations of the electrical resistivity characteristics by which the uncontaminated zones of these formations may be distinguished from the zones invaded by filtrate from the fluid employed in the drilling operation.

A further object of this invention is to provide new and improved apparatus for obtaining such contemporaneous resistivity measurements wherein components are employed which may have a rugged, thermally stable, compact design adapting them for the severe conditions encountered in deep well drilling.

These and other objects of this invention are attained by combining the flow of a main survey current and an auxiliary current through formations surrounding a bore hole and periodically varying their penetration into the surrounding formations. With the lesser penetration extending to a depth to which invasion of the drilling fluid filtrate may extend and the greater depth of penetration ranging considerably beyond this extent, potential differences along the current paths corresponding to the different depths of penetration will reflect resistivity values which may be correlated to eliminate the effects of filtrate invasion upon a determination of the true formation resistivity. The time sequencing of these deep and shallow penetrations of the current field is accomplished by switching arrangements in the circuitry, the switching being accomplished either by mechanical means such as rotary switches or fast-acting relays or by electronic means such as a blanking signal generator. By preference, the distinctive formation resistivities which are simultaneously obtained by this invention are graphically impressed upon a single record as a function of the depth of the formation below the earth's surface. With the realization that both mechanical and electronic means for switching can be embodied in rugged, thermally stable, compact form, it will be evident that this invention leads to the objects aforestated.

The invention and others of its objects and advantages will be more clearly perceived from the following detailed description of several typical embodiments, taken in conjunction with the accompanying drawings, in which.

Figure 2:
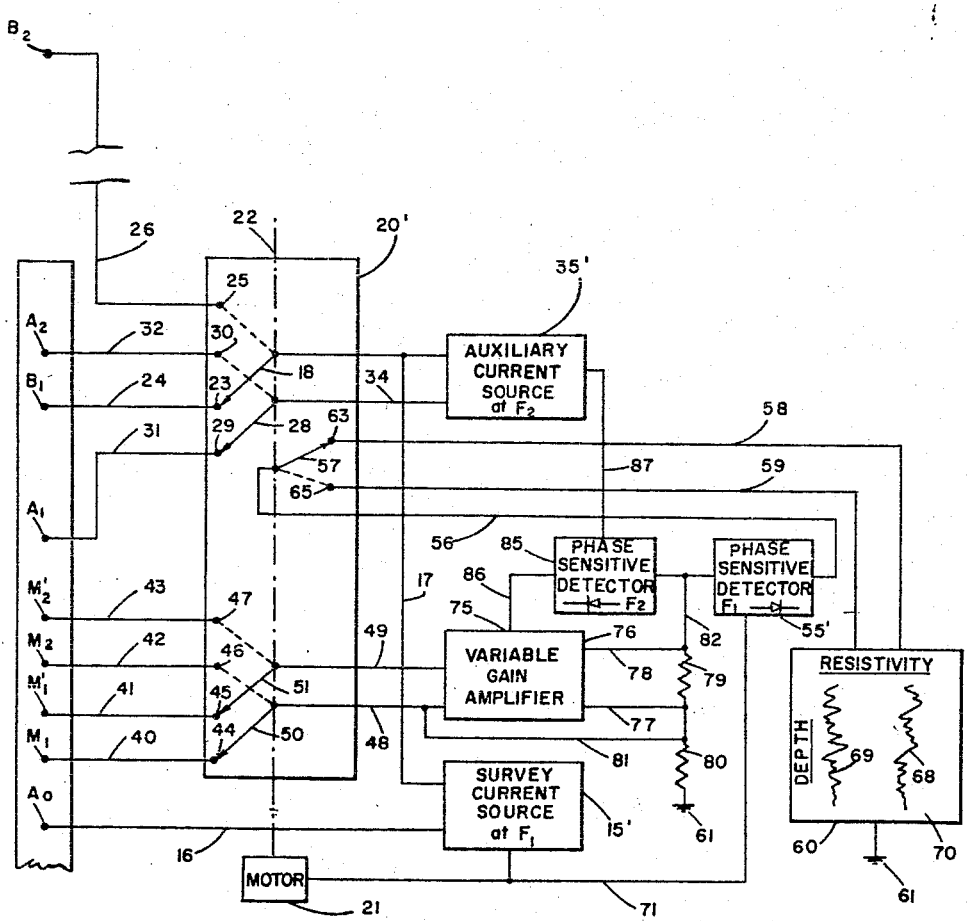
Fig. 2 is a schematic representation of an embodiment of the invention having a different measuring circuit than that employed in Fig. 1 and having the symmetrically connected portion of the electrode array omitted for convenience of illustration.
Figure 4:
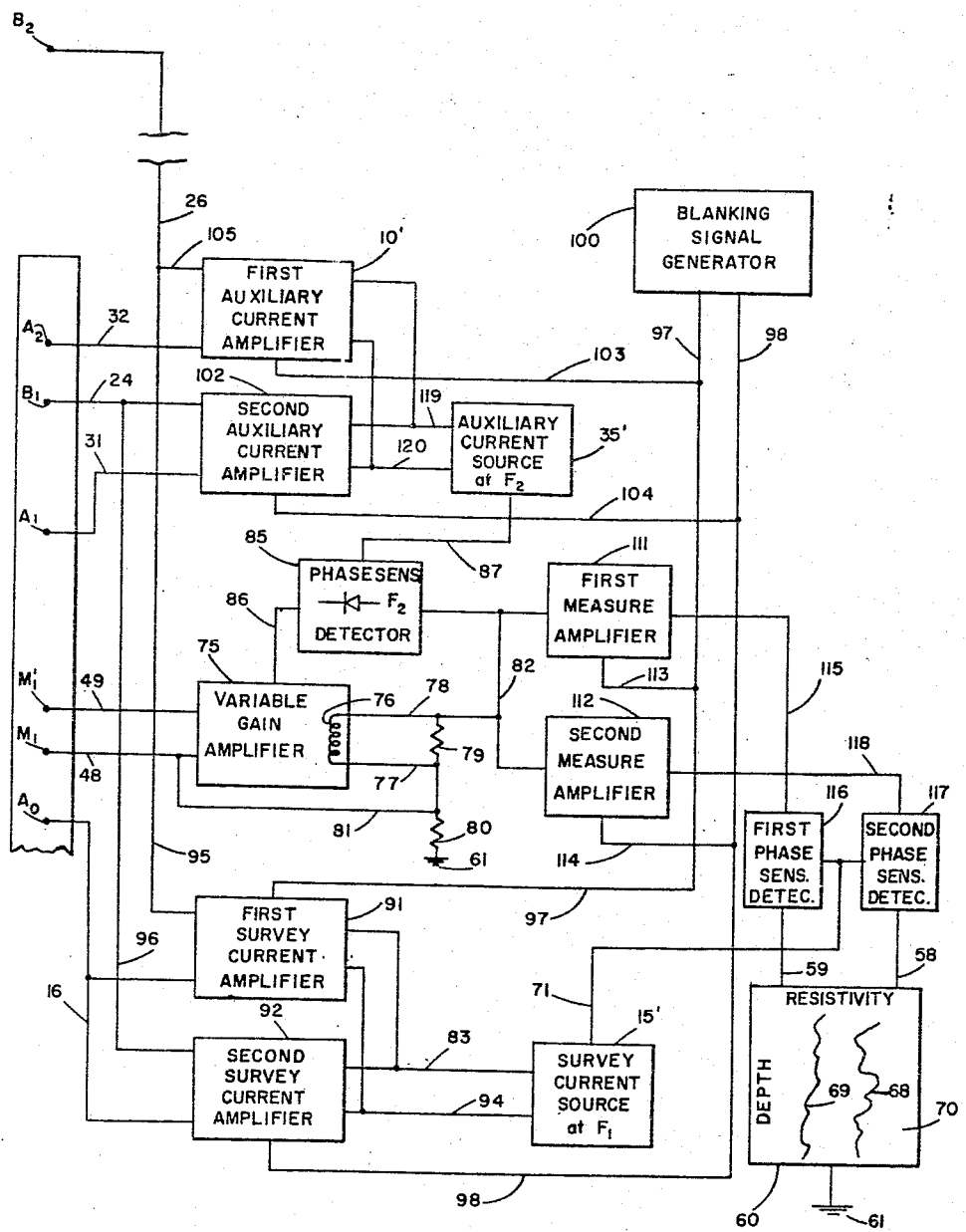
Figure 5:
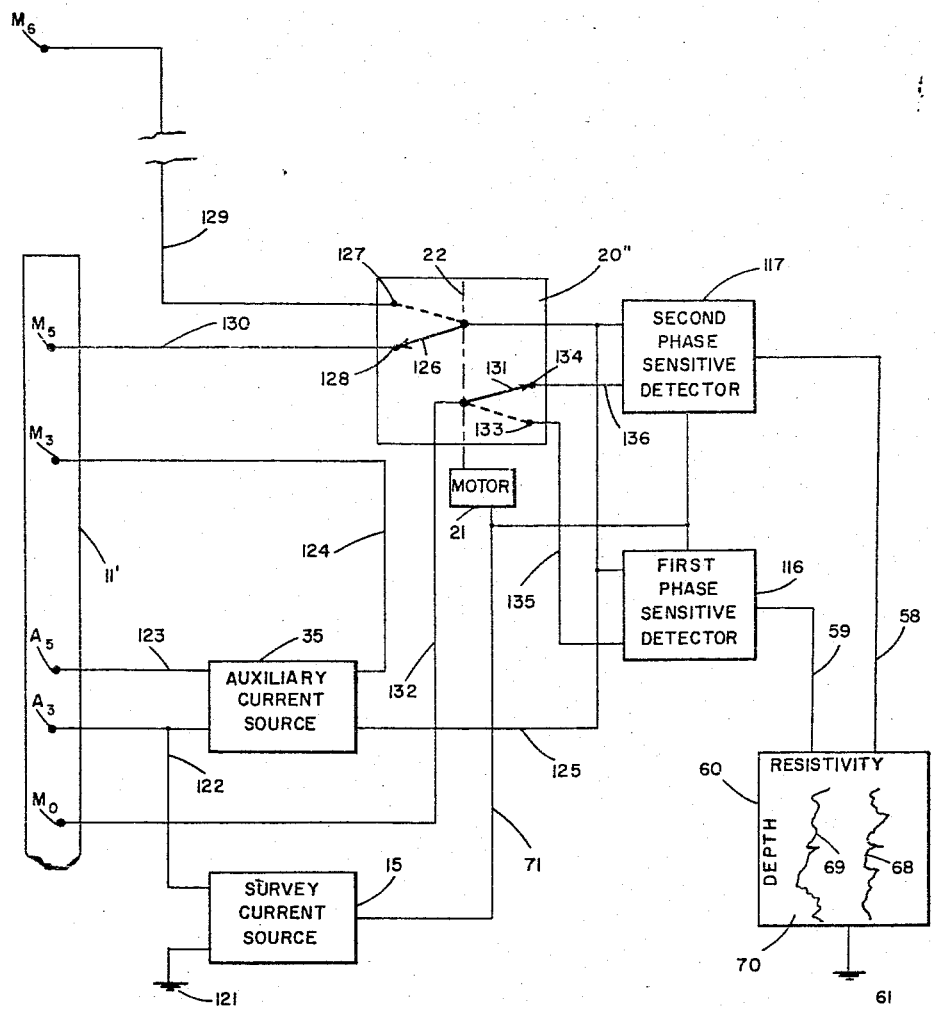

Fig. 4 is a schematic representation of yet another embodiment of the invention employing in its measuring circuit principles employed in the measuring circuit of Fig. 2; and Fig. 5 is a schematic representation of still another embodiment in which the functions of the electrodes in the preceding figures as to current introduction and potential monitoring are transposed to an extent commensurate with the principles of this invention.

The measurement of formation resistivities in which the desired influences upon such measurements have been selectively emphasized is the subject of copending applications assigned to the assignee of this application. Thus, a selective emphasis of the true formation resistivity is taught in copending application Serial No. 161,641, filed May 12, 1950, entitled "Electrical Resistivity Well Logging Method and Apparatus," by H. G. Doll, now Patent 2,712,627, granted July 5, 1955. On the other hand, a selective emphasis of the resistivity of the zone relatively close to the bore hole wall, characterized as the invaded zone in formations permeated by filtrate from the bore hole fluid, has been disclosed in application Serial No. 257,348, filed November 20, 1951, for "Methods and Apparatus for Electrical Logging of Wells," by H. G. Doll, now Patent 2,712,630, granted July 5, 1955. Other techniques for emphasizing similar factors are disclosed in application Serial No. 282,579, filed April 16, 1952, by M. C. Ferre for "Electrical Well Logging," now Patent 2,712,631, granted July 5, 1955, and application Serial No. 292,073, filed June 6, 1952, by N. A. Schuster for "Well Logging Methods and Apparatus," now Patent 2,770,771, granted November 13, 1956. Reference will be made to these applications for a more complete description of certain aspects of the present invention.

Figure 1:
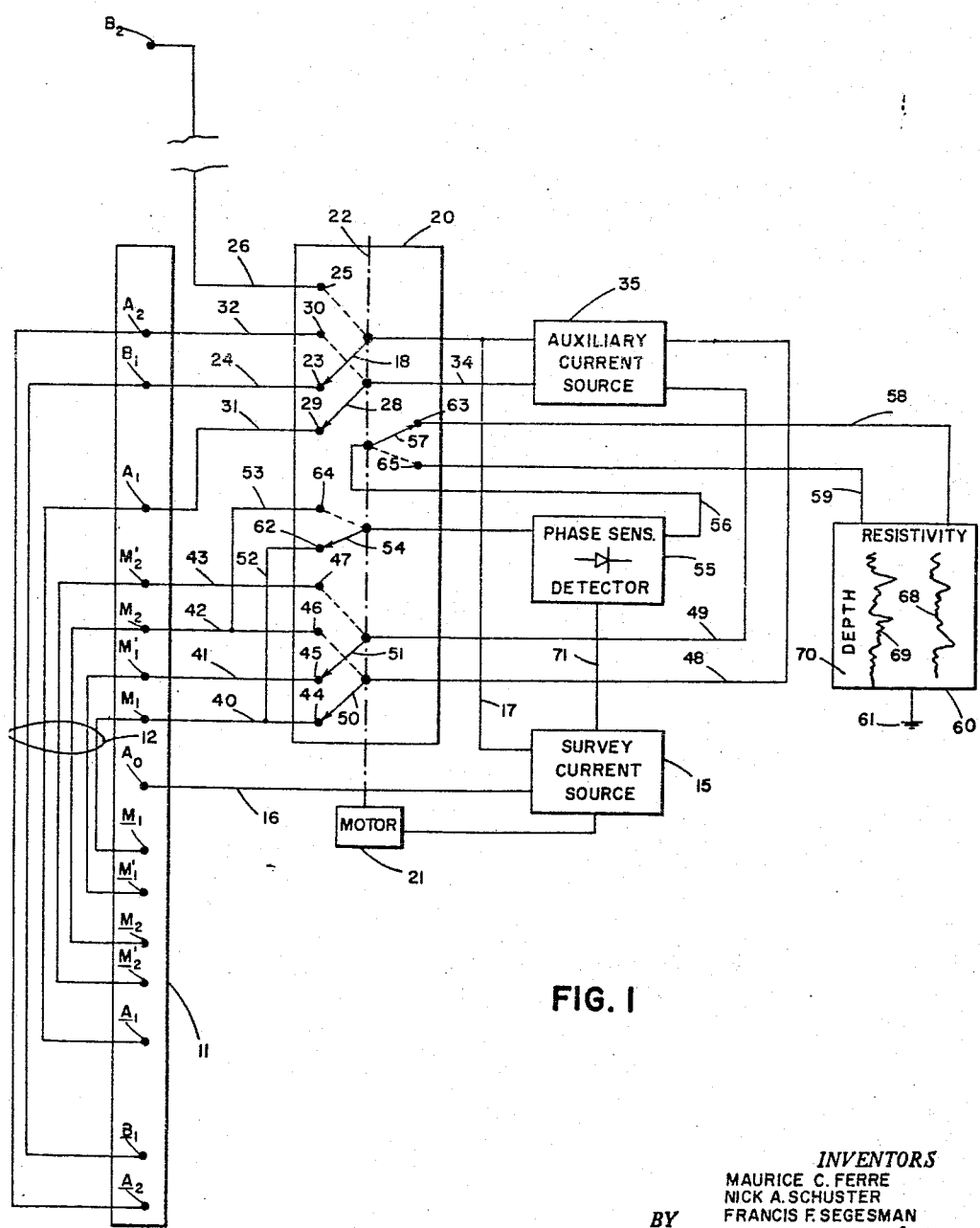
Fig. 1 is a schematic representation of typical geophysical exploring apparatus constructed in accordance with the invention.

In Fig. 1 is shown an electrode array 11 having a plurality of electrodes spaced vertically therealong in aligned fashion for movement through a bore hole containing a drilling fluid (not shown). Such movement may be accomplished by raising and lowering the array by means of an electrical cable (not shown) extending to hoisting equipment (not shown) located at the surface of the earth. By preference, the electrodes are arranged symmetrically above and below a main electrode $A_0$ with corresponding upper and lower electrodes shorted together by means of low resistance insulated conductors 12. The lower electrodes are distinguished from their corresponding upper electrodes by an underlining of the identifying symbol. For purposes of convenience, the lower electrodes, as well as the conductors 12, will be omitted from the ensuing description, although the value of the symmetry to accurate and efficient measurements of resistivity should not for this reason be disregarded. Accordingly, the description will be confined to those of the electrodes in the array 11 located above the electrode $A_0$, together with electrode $A_0$.

This main electrode $A_0$ is arranged on the array 11 to introduce into the surrounding media a survey current which is supplied to the electrode $A_0$ from a survey current source 15 by means of conductor 16. The survey current is returned to source 15 by a conductor 17 through a movable contact 18 of a synchronized multiple switching device 20. Such switching device 20 may be in the form of a ganged rotary switch, for example, or one or more relays having appropriate contacts. At any rate, the switching operation of this device 20 should coincide with passage of an integral number of cycles of survey current into the formations to avoid a resultant D.C. component. Accordingly, it is here shown synchronized by a switch stepping motor 21 having a rotary shaft 22 extending through the switching device 20 and having connection with the survey current source 15.

As the movable contact 18 affords alternative connections either through contact 23 and conductor 24 to a pseudo-ground electrode $B_1$ or through contact 25 and conductor 26 to a reference ground electrode $B_2$, a periodic variation in the survey current circuit is obtained. The pseudo-ground electrode $B_1$ is located on the electrode array 11 and may be said to be electrically proximate to the electrode array in the sense that its close position to the electrodes of the array 11 results in a substantially different electric field about the array than would have been obtained with the electrode $B_1$ removed to an infinitely remote location. The electrode $B_2$, on the other hand, is located remotely from the array 11, for example, several times the length of the array up the supporting electrical cable (not shown) or at the earth's surface. In consequence, the electrode $B_2$ may be considered to lie at electrical infinity with respect to the array 11, in contradistinction to electrically proximate thereto, as it would have substantially no different an effect upon the electrical field in the vicinity of the array 11 were the electrode $B_2$ infinitely remote. Survey current passing from the electrode $A_0$ to the electrode $B_2$ will penetrate the adjacent formations to a substantially greater extent than survey current passing from the electrode $A_0$ to electrode $B_1$.

To further emphasize the differing penetrations of these survey current streams, auxiliary electrodes $A_1$ and $A_2$ are carried on the array 11 to introduce auxiliary currents having differing penetrations sequenced in step with the change in penetration for the survey current. To accomplish this, the electrodes $A_1$ and $A_2$ are alternately connected to a movable contact 28 through contacts 29 and 30 connected respectively by conductors 31 and 32 to the electrodes $A_1$ and $A_2$. The movable contact 28, in turn, is connected through a conductor 34 to one output terminal of an auxiliary current source 35. As the other output terminal of the auxiliary current source 35 is connected in common with the conductor 17 to the current return electrodes, that is the pseudo-ground electrode $B_1$ and the reference ground electrode $B_2$ alternatively through the movable contact 18, it will be apparent that the auxiliary currents from the electrodes $A_1$ and $A_2$ will alternate between shallow and deep penetrations of the formations, respectively. The deep and shallow penetrations of the auxiliary current are kept in step with the similar changes in penetration of the survey current by means of corresponding dispositions of the movable contacts 18 and 28 on the shaft 22 in relation to the associated fixed contacts and more particularly by the disposition of the movable contact 18 in the circuits for both the survey current and the auxiliary current.

In seeking the differing penetrations of the current streams into the adjacent formations, a demarcation between these penetrations is normally sought which corresponds to the depth of invasion by filtrate from the drilling fluid laterally through the bore hole wall into permeable formations. To achieve this demarcation, the spacing along the array 11 of the electrodes carrying only the deeply penetrating currents may necessarily be different from the spacing of those electrodes carrying only the shallowly penetrating currents. Accordingly, separate auxiliary electrodes $A_1$ and $A_2$ are shown in Fig. 1, although under certain conditions or by a compromise design a single auxiliary electrode connected directly to the conductor 34 suffices.

A significant function of the auxiliary currents is to concentrate the survey current in a path passing perpendicularly through the wall of the bore hole, that is, radially outward from the array 11 by blocking current flow upwardly and downwardly lengthwise of the array through the drilling fluid. To this end, the polarity at any instant of the auxiliary current at the electrode $A_1$ or $A_2$ and of the survey current at electrode $A_0$ is identical. Furthermore, the auxiliary current source 35 is preferably a null-seeking amplifier or servomechanism, so as to supply a magnitude of auxiliary current which will create a region of zero potential difference extending transversely of the borehole intermediate the main electrode $A_0$ and the auxiliary electrodes $A_1$ and $A_2$. In view of the different spacings of the auxiliary electrodes $A_1$ and $A_2$, it may be expected that the intermediate regions of zero potential difference will have positions differing in the same relation. Thus, monitoring electrodes $M_1$ and $M_1'$ are bridged across a first region, while monitoring electrodes $M_2$ and $M_2'$ are bridged across a second region, these region corresponding in their relative distances from the electrode $A_0$ to the relative distances of the electrode $A_1$ and the more remote electrode $A_2$. The potential differences across these pairs of monitoring electrodes $M_1$, $M_1'$ and $M_2$, $M_2'$ are alternately transmitted to the high impedance input of the auxiliary current source 35 through the pairs of conductors 40, 41 and 42, 43 terminating in contacts 44, 45 and 46, 47 alternately connected with the input conductors 48 and 49 by means of movable contacts 50 and 51, respectively. As movable contacts 50 and 51 have the same position on shaft 22 in relation to the fixed contacts 44, 45 and 46, 47 as does movable contact 28 in relation to fixed contacts 29 and 30, it will be apparent that auxiliary current flowing from electrode $A_1$ will be regulated in accordance with the character of auxiliary current source 35 to create a region of zero potential difference between the monitoring electrodes $M_1$, $M_1'$. During alternate periods of the switching cycle, auxiliary current introduced into the surrounding media by electrode $A_2$ will be regulated to create a region of zero potential difference between the monitoring electrodes $M_2$ and $M_2'$.

The passage of the survey current and the auxiliary current alternately along a path deeply penetrating the adjacent formations and a path of shallow penetration gives rise to distinguishable potential differences along these paths representative of the resistivities of the media traversed by the respective paths. As pointed out previously, the demarcation between the deep and shallow penetration is designed to emphasize, respectively, the true formation resistivity and the resistivity of the invaded zones of the formations. A measure of these differing resistivity values may be secured in step with the switching cycle by measuring a potential in the vicinity of the electrode $A_0$, such as in the regions of zero potential difference and determining the ratio of such potential to the magnitude of the survey current. In the present instance where two regions of zero potential difference are alternately created, it is preferable to alternately measure potentials associated with these respective regions. Accordingly, the potential at the electrode $M_1$ may be taken when auxiliary current flows through electrode $A_1$, and the potential at the electrode $M_2$ may be taken when auxiliary current flows through electrode $A_2$. This is accomplished by alternately connecting conductors 52 and 53 through a movable contact 54 to a phase-sensitive detector 55 arranged in series in the conductor 56 and in turn connecting through movable contact 57 alternately with the conductors 58 and 59 to an indicating device 60 of the multiple channel type, which is connected to ground at 61. The alternate potential measuring paths may be traced as follows. Electrode $M_1$ is connected by conductors 40 and 52 to a fixed contact 62, thence through movable contact 54 through conductor 56 and phase-sensitive detector 55 to movable contact 57, which at this portion of the switching cycle is connected to a fixed contact 63 joining with the conductor 58 to the indicating device 60. The path from the electrode $M_2$ to the indicating device 60 is through conductors 42 and 53, a fixed contact 64 and a movable contact 54 in its alternative position, phase-sensitive detector 55, conductor 56, movable contact 57 in its alternative position contacting fixed contact 65, and thence through conductor 59. The indicating device 60 is arranged to graphically represent the resistivity values varying as a function of the depth of the array in the bore hole in response to the alternately appearing signals on conductor 58 and 59 by means of curves 68 and 69 on a record 70. At the switching position illustrated in full lines, resistivity values corresponding to the shallow penetrating paths of survey current are recorded as curve 68. In the alternative position of the movable contacts, indicated in dotted lines, curve 69 will be recorded representing the resistivity values of the deeply penetrating survey current. By selecting a suitable repetition rate for the switching cycle, the appearance of the curves 68 and 69 will be substantially continuous and will facilitate an accurate geophysical analysis of the formations investigated.

The function of the phase-sensitive detector 55 having a reference signal supplied to it by conductor 71 connecting with the survey current source 15 is to rectify the potentials measured at the monitoring electrodes $M_1$ and $M_2$. This is especially desirable where the conductors 58 and 59 are grouped in the support cable with conductors carrying the survey current, for example, as alternating signals induced in the conductors 58 and 59 may be eliminated without creating error by rendering the indicating device 60 sensitive only to direct current.

In operation, the survey current source 15 is energized thereby to start the switching motor 21 into cyclic operation and to pass survey current from the electrode $A_0$ into the surrounding formations. The potential differences created by the survey current across the pairs of monitoring electrodes $M_1$, $M_1'$ and $M_2$, $M_2'$ are alternately fed to the auxiliary current source 35 for adjusting the auxiliary currents alternately supplied from the electrodes $A_1$ and $A_2$ in amounts which will create zero potential differences across these pairs of monitoring electrodes, thereby to facilitate accurate resistivity measurements. The resistivity values will then be graphed upon the record 70 against a resistivity scale proportioned to the survey current.

In contrast to the resistivity measuring circuit of Fig. 1 which employs principles of the above-mentioned application Serial No. 161,641, the resistivity measuring circuit of Fig. 2 employs principles of the above-mentioned application Serial No. 292,073. This measuring circuit employs a computer which relates a measure of potentials at a first frequency $F_1$, which is the frequency of survey current source 15', to potential measurements at a second frequency $F_2$, which is the frequency of auxiliary current source 35'. So that a linear resistivity scale may be employed on the record 70, the sources 15' and 35' are arranged to provide steady or constant current and therefore the auxiliary current source 35' may be simply an alternating current generator rather than a null-seeking amplifier or servo-mechanism as is preferred for the auxiliary current source 35 of Fig. 1.

The computer of Fig. 2 is arranged generally in accordance with the teachings of the above-mentioned application Serial No. 292,073 and comprises a variable gain amplifier 75 having its input connected with conductors 48 and 49 and its output side 76 connected by conductors 77 and 78 across an impedance such as resistance 79. The conductor 48 also connects with an impedance such as resistance 80 by means of a conductor 81. This resistance 80 is connected in series between ground 61 and the resistance 79, so that the potential of the conductor 48 (which is alternately a potential of the electrodes $M_1$ and $M_2$) will be added to the potential difference appearing across the conductors 48 and 49 (alternately being the potential difference across the pair of electrodes $M_1$, $M_1'$ and $M_2$, $M_2'$) amplified in accordance with the gain of amplifier 75. The sum of the potentials appearing across the resistances 79 and 80 is applied by conductor 82 to a phase-sensitive detector 55' which rectifies and passes only the components at the first frequency $F_1$, and phase-sensitive detector 85 which rectifies and passes only the components of frequency $F_2$. It will be apparent that the phase-sensitive detector 85 and conductor 86 connecting with the gain control circuit of the amplifier 75 constitute a feedback loop by which the gain of the amplifier 75 may be adjusted to set substantially at zero the sum of the potentials at frequency $F_2$ appearing across the resistances 79 and 80. The output of the amplifier 75 at the frequency $F_1$ is amplified by this same gain and when added to the potential across resistance 80 at frequency $F_1$ gives a total signal which is representative of the resistivity value corresponding to a predetermined survey current path even though the survey current is not actually confined to such path. The detectors 55' and 85 are made frequency selective by supplying them with reference signals from the source 15' and the source 35', respectively, through conductors 71 and 87. The output of detector 55' is alternately connected to the input conductors 58 and 59 of the indicating device 60, just as was the detector 55 in Fig. 1.

Accordingly, the apparatus of Fig. 2 enjoys an advantage over the apparatus of Fig. 1 in the elimination of switch 54, 62, 64 and in eliminating the requirement for an auxiliary current source 35 having a wide range of adjustable output currents.

Switching device 20 of Fig. 1 or switching device 20' of Fig. 2 may each be arranged so that the movable contacts 50 and 51 of the measuring circuit close after the contacts 18 and 28 of the current circuits so that a steady state condition may be reached following the switching transients. This same sequencing may also be employed in the subsequently described embodiments.

Figure 3:
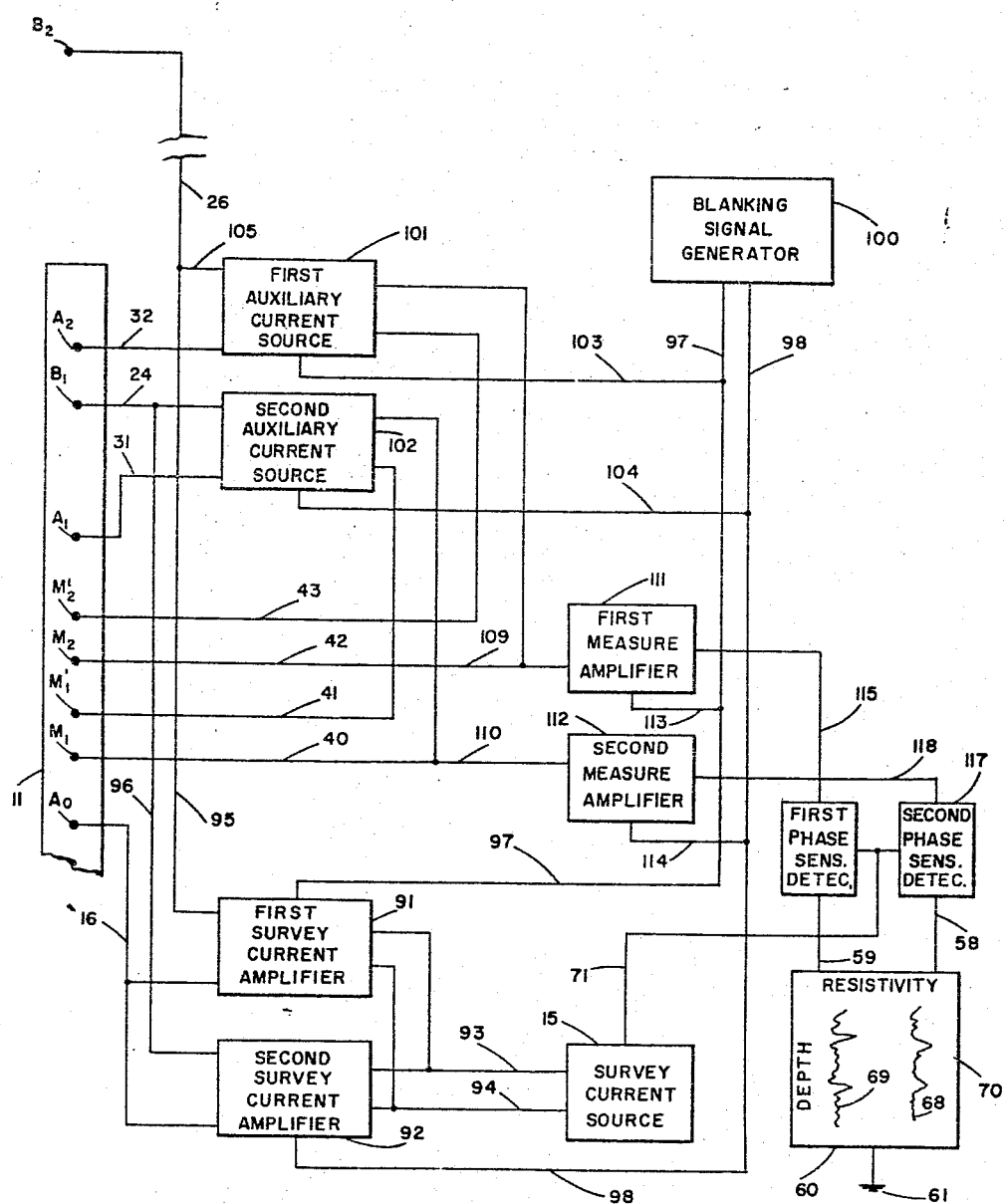
Fig. 3 is a schematic representation of yet another embodiment of the invention in which time sequencing is accomplished by a blanking signal generator.

Instead of a mechanical switching device, it is contemplated that an electronic switching arrangement may be adapted to the principles of this invention as shown in Fig. 3. Employing the same electrode array 11, survey current is supplied to the electrode $A_0$ over conductor 16 by both a first and a second survey current amplifier 91 and 92, each having their inputs connected across conductors 93 and 94 to be supplied with current from the survey current source 15. The first survey current amplifier is connected by conductor 95 through conductor 26 to the electrode $B_2$ and thus provides a survey current having a deep penetration of the adjacent formations. On the other hand, the second survey current amplifier 92 connects through conductor 96 and conductor 24 with the nearer current return electrode $B_1$ thus to furnish a survey current having a relatively shallow penetration of these formations. A periodic alternation between these deep and shallow survey current paths is achieved by suitably connecting the amplifiers 91 and 92, respectively, through conductors 97 and 98 to a blanking signal generator 100.

As is conventional in electronic switching, the blanking signal generator has a square wave output signal with the square wave blanking pulses on conductor 97 180° out of phase with the similar pulses on conductor 98. By applying these out-of-phase pulses to a pair of amplifiers, such as the amplifiers 91 and 92, these amplifiers are alternately biased to cut off or otherwise caused to have zero outputs. Hence, the deeply penetrating survey current from the first amplifier 91 will be passed through adjacent formations alternately with the shallowly penetrating survey current from the second amplifier 92.

Similarly with the auxiliary currents, a first auxiliary current source 101 and a second auxiliary current source 102 are connected by conductors 103 and 104, respectively, to the conductors 97 and 98 from the blanking signal generator 100. As the output conductors 32 and 105 from the first auxiliary current source 101 are connected across the electrodes $A_2$ and $B_2$, a deeply penetrating auxiliary current will be passed into the adjacent formations during the same alternate periods as deeply penetrating survey current is supplied from the first survey current amplifier 91. A similar correspondence of the shallowly penetrating auxiliary current and survey current is achieved through connection of the second auxiliary current source 102 through its output conductors 24 and 31 to the electrodes $B_1$ and $A_1$.

So that regions of zero potential difference will be created between the pairs of monitoring electrodes $M_2$, $M_2'$ and $M_1$, $M_1'$ correspondingly with the deep and shallow penetrations, the first and second auxiliary current sources 101 and 102 are directly connected by conductors 42, 43 and 40, 41 to these respective pairs of monitoring electrodes. Moreover, these first and second auxiliary current sources 101 and 102 have the same null-seeking characteristic of the auxiliary current source 35 of Fig. 1. Again as in Fig. 1, the measuring circuit connects with the monitoring electrodes $M_1$ and $M_2$ through conductors 40 and 42, but here in Fig. 3 the connection is made through conductors 109 and 110, respectively, to first and second measure amplifiers 111 and 112. As the first measure amplifier 111 will carry the signal corresponding to the resistivity values for the deeply penetrating path, it is connected to the conductor 97 from the blanking signal generator in common with the first survey current amplifier 91 and the first auxiliary current source 101. Similarly, the arrangement of the second measure amplifier 112 to carry a signal corresponding to the resistivity values along the shallowly penetrating current path requires that it be connected to the conductor 98 from the blanking signal generator. These connections are accomplished, respectively, by conductors 113 and 114. The output of the first measure amplifier 111 is carried by conductor 115 to a first phase-sensitive detector 116, while the output for the second measure amplifier 112 is connected to a second phase-sensitive detector 117 by conductor 118. These first and second phase-sensitive detectors receiving a reference signal from the survey current source 15 through conductor 71 serve to rectify the measure signals and to apply them respectively to conductors 59 and 58 for recording as curves 69 and 68 on the record 70 of the indicating device 60.

The denotations of various components as "first" and "second" are employed in Fig. 3 (as well as Fig. 4) to distinguish the components which are operative in first and second portions of the switching cycle established by the blanking signal generator 100. A very rapid switching action may be seen to follow from use of the electronic switching arrangement here described with the obviation of many maintenance problems which the employment of mechanical switching entails.

The electronic switching arrangement of Fig. 4 is employed with the computer in the measuring circuit, as was described in Fig. 2. For a computer-type measurement it is necessary that the survey current source 15' and the auxiliary current source 35' operate at different frequencies, such as $F_1$ and $F_2$, and it is desirable that these sources supply constant or steady current. Each source 15' and 35' is connected to a first and second amplifier so that the alternate switching action of the blanking signal generator 100 may be applied to both currents, as described in connection with Fig. 3. The auxiliary current source 35', for example, is connected by conductors 119 and 120 to the inputs of both the first and second auxiliary current amplifiers 101 and 102 and these connect, respectively, to the electrodes $A_2$, $B_2$ and $A_1$, $B_1$ representing deep and shallow current penetrations, respectively. Rather than employ two pairs of monitoring electrodes, a single pair of such electrodes $M_1$, $M_1'$ is disposed intermediate the electrodes $A_0$ and $A_1$ at a position which may represent a compromise in design. The nature and operation of other portions of the apparatus of Fig. 4 will be evident through the employment of reference numerals corresponding to parts having similar functions and described in conjunction with Figs. 2 and 3.

A different electrode array 11' is employed in Fig. 5 wherein the relative positions for current introduction and potential monitoring are different. The suitability of this array of electrodes for the measurement of resistivity values for both shallow and deep penetration of adjacent formations is established in the above-mentioned application Serial No. 282,579. Mechanical switching is again employed as it was in Figs. 1 and 2.

The array 11' carries a main current electrode $A_3$, an auxiliary current electrode $A_5$ positioned outwardly of it, a measuring electrode $M_0$ and a monitoring electrode $M_3$ positioned inwardly and outwardly, respectively, of the current electrodes $A_3$ and $A_5$, and a pseudo-ground electrode $M_5$. At what may be considered an infinitely remote position, a reference ground electrode $M_6$ is positioned. The survey current source 15 having one of its output terminals grounded at 121 has its other output terminal connected through conductor 122 to the electrode $A_3$ and to one terminal of the auxiliary current source 35. The polarity of this terminal of the auxiliary current source 35 is arranged so that the auxiliary current and the survey current will have the same instantaneous polarities along the conductor 122. The other output terminal of the auxiliary current source 35 is connected by a conductor 123 to the auxiliary current electrode $A_5$.

With this arrangement of electrodes, the zero potential difference which is to be created by the interaction of the auxiliary and survey currents lies alternately between electrode $M_3$ and the reference ground electrode $M_6$, and between electrode $M_3$ and the pseudo-ground electrode $M_5$, corresponding respectively to shallow and deep penetrations of the adjacent formations.

To this end, the input to the auxiliary current source 35 is connected by conductor 124 to electrode $M_3$ and by conductor 125 to a movable contact 126 in the switching device 20", which alternates between contacts 127 and 128 for connection respectively to electrodes $M_6$ and $M_5$ respectively through conductors 129 and 130.

In the alternating sequence, the movable contact 126 connects the first and second phase-sensitive detectors 116 and 117 through conductor 125 to the electrodes $M_5$ and $M_6$. This alternation in the measuring circuit is completed by a movable contact 131 connected with the measuring electrode $M_0$ through conductor 132 so as as alternately to apply the potential of this electrode $M_0$ through the fixed contacts 133 and 134 and associated conductors 135 and 136 to the first and second detectors 116 and 117, respectively. As in Fig. 3, these detectors are connected by conductor 71 to the survey current source 15 so as to receive a reference signal whereby the measure signals are rectified and supplied respectively to the conductors 58 and 59 connecting with the indicating device 60. The switching motor 21 may conveniently be connected in parallel with the conductor 71 to operate the switching device 20″ synchronously with the survey current source 15.

In operation, the survey current source 15 is energized to supply current from the electrode $A_3$ to the surrounding media, at the same time energizing the switching motor 21 through conductor 71 to commence the alternations between a survey current circuit extending to the reference electrode $M_6$ and a less penetrating survey current circuit extending to the pseudo-ground electrode $M_5$. By suitably related alternations in the measuring circuit, the resistivity values corresponding to a deep and a shallow penetration by the survey current are recorded as curves 69 and 68 respectively on the record 70. Again, it should be observed that the array 11′ will preferably include electrodes on an under portion positioned symmetrically about the electrode $M_0$ in relation to the corresponding electrodes in the upper portion illustrated in Fig. 5, with suitable low resistance connections between the corresponding upper and lower electrodes.

It will be apperent that electrode arrays inverted in relation to those above described may be employed with utility. Further, it will be clear that the pseudo-ground electrode may be carried on the cable a short distance above the adjacent auxiliary electrode and the reference ground electrode carried on the cable a much greater distance thereabove, such that the pseudo-ground electrode may be considered a part of the electrode array and the ground electrode may be considered an infinitely remote reference point.

These and ohter modifications lying within the true scope and spirit of this invention are intended to be embraced within the ambit of the appended claims.

We claim:

1. A method for determining the resistivities of formations traversed by a bore hole in zones near to and remote from the bore hole wall, comprising the steps of introducing survey current at a first point in the bore hole, alternately passing an opposing auxiliary current from one of two spaced-apart points adjacent said first point, alternately collecting such survey and auxiliary currents at points spaced electrically proximate to and electrically remote from said first point, and synchronously converting potentials adjacent said first point to either of two juxtaposed resistivity representations.

2. A method for determining the resistivities of formations traversed by a bore hole in zones near to and remote from the bore hole wall, comprising the steps of introducing survey current at a first point in the bore hole, passing an auxiliary current from a region adjacent said first point with a frequency different from the frequency of said survey current, alternately collecting such survey and auxiliary currents at points spaced electrically proximate to and electrically remote from said first point, and synchronously converting potentials of both frequencies occurring adjacent said first point to either of two juxtaposed resistivity representations.

3. A method for determining the resistivities of formations traversed by a bore hole in zones near to and remote from the bore hole wall, comprising the steps of passing survey current through such formations between a first location in the bore hole and a reference point electrically remote therefrom, passing an opposing auxiliary current through such formations between a pair of spaced-apart locations in the vicinity of said first location, adjusting said auxiliary current to set to zero the potential difference between a region separated from said first location by said spaced-apart locations and an electrically proximate reference point and alternately therewith between said region and said electrically remote reference point, and converting potentials adjacent said first point alternately with reference to said electrically proximate reference point and said electrically remote reference point to either of two juxtaposed resistivity representations.

4. In apparatus for investigating earth formations traversed by a borehole, the combination comprising: an array of electrodes adapted for movement through the borehole and including a main electrode, first and second auxiliary electrodes positioned adjacent the main electrode at different distances therefrom, and a pseudo-ground electrode electrically proximate to the other electrodes; a remote ground electrode substantially at electrical infinity with respect to said array; circuit means for passing a survey current between the main electrode and the pseudo-ground electrode during shallow penetration time intervals and between the main electrode and the remote ground electrode during separate deep penetration time intervals; circuit means for passing an auxiliary current between the first auxiliary electrode and the pseudo-ground electrode during the shallow penetration time intervals and between the second auxiliary electrode and the remote ground electrode during the deep penetration time intervals; means responsive to potentials in the vicinity of the main electrode for developing shallow penetration and deep penetration resistivity signals representative of an effective focused current flow from the main electrode; and indicating means having a first unit responsive to the shallow penetration resistivity signals for providing an indication of the formation resistivity near to the borehole and having a second unit responsive to the deep penetration resistivity signals for providing an indication of the formation resistivity at a more remote distance from the borehole.

5. In apparatus for investigating earth formations traversed by a borehole, the combination comprising: an array of electrodes adapted for movement through the borehole and including a main electrode, first and second auxiliary electrodes positioned adjacent the main electrode at different distances therefrom, and a pseudo-ground electrode electrically proximate to the other electrodes; a remote ground electrode substantially at electrical infinity with respect to said array; circuit means for passing a survey current between the main electrode and the pseudo-ground electrode during shallow penetration time intervals and between the main electrode and the remote ground electrode during separate deep penetration time intervals; circuit means for passing an auxiliary current between the first auxiliary electrode and the pseudo-ground electrode during the shallow penetration time intervals and between the second auxiliary electrode and the remote ground electrode during the deep penetration time intervals; potential monitoring means for providing indications of potential differences intermediate the main electrode and the auxiliary electrodes; feedback control means coupled to the potential monitoring means for regulating the amount of auxiliary current supplied by the auxiliary circuit means for maintaining a region of substantially zero potential difference intermediate the main electrode and the corresponding auxiliary electrode during each of the sets of time intervals; means for providing indications of the potentials in the vicinity of such zero potential differences, such potentials constituting shallow penetration and deep penetration resistivity signals during the respective time intervals; and indicating means having a first unit responsive to the shallow penetration resistivity signals for providing an indication of the formation resistivity near to the borehole and having a second unit responsive to the deep penetration resistivity signals for providing an indication of the formation resistivity at a more remote distance from the borehole.

6. In apparatus for investigating earth formations traversed by a borehole, the combination comprising: an array of electrodes adapted for movement through the borehole and including a main electrode, first and second auxiliary electrodes positioned adjacent the main electrode at different distances therefrom, and a pseudo-ground electrode electrically proximate to the other electrodes; a remote ground electrode substantially at electrical infinity with respect to said array; circuit means for passing a survey current between the main electrode and the pseudo-ground electrode during shallow penetration time intervals and between the main electrode and the remote ground electrode during separate deep penetration time intervals; circuit means for passing a separately-measurable auxiliary current between the first auxiliary electrode and the pseudo-ground electrode during the shallow penetration time intervals and between the second auxiliary electrode and the remote ground electrode during the deep penetration time intervals; potential monitoring means for providing indications of potentials in the vicinity of the main electrode; computer means coupled to the potential monitoring means and having a first portion responsive to the potential indications resulting from the survey current and having a second portion responsive to the potential indications resulting from the separately-measurable auxiliary current for jointly developing shallow penetration and deep penetration resistivity signals during the respective time intervals; and indicating means having a first unit responsive to the shallow penetration resistivity signals for providing an indication of the formation resistivity near to the borehole and having a second unit responsive to the deep penetration resistivity signals for providing an indication of the formation resistivity at a more remote distance from the borehole.

7. In apparatus for investigating earth formations traversed by a borehole, the combination comprising: an array of electrodes adapted for movement through the borehole and including a main electrode, auxiliary electrode means positioned adjacent the main electrode, and a pseudo-ground electrode electrically proximate to the other electrodes; a remote ground electrode substantially at electrical infinity with respect to said array; circuit means for passing a survey current between the main electrode and the pseudo-ground electrode during shallow penetration time intervals and between the main electrode and the remote ground electrode during separate deep penetration time intervals; circuit means for passing a separately-measurable auxiliary current between the auxiliary electrode means and the pseudo-ground electrode during the shallow penetration time intervals and between the auxiliary electrode means and the remote ground electrode during the deep penetration time intervals; potential monitoring means for providing indications of potentials in the vicinity of the main electrode; computer means coupled to the potential monitoring means and having a first portion responsive to the potential indications resulting from the survey current and having a second portion responsive to the potential indications resulting from the separately-measurable auxiliary current for jointly developing shallow penetration and deep penetration resistivity signals during the respective time intervals; and indicating means having a first unit responsive to the shallow penetration resistivity signals for providing an indication of the formation resistivity near to the borehole and having a second unit responsive to the deep penetration resistivity signals for providing an indication of the formation resistivity at a more remote distance from the borehole.

8. In apparatus for investigating earth formations traversed by a borehole, the combination comprising: an array of electrodes adapted for movement through the borehole and including a main electrode, auxiliary electrode means positioned adjacent the main electrode, and a pseudo-ground electrode electrically proximate to the other electrodes; a remote ground electrode substantially at electrical infinity with respect to said array; survey-current circuit means including a first amplifier circuit for passing a survey current between the main electrode and the remote ground electrode and a second amplifier circuit for passing a survey current between the main electrode and the pseudo-ground electrode; auxiliary-current circuit means including a first amplifier circuit for passing an auxiliary current between the auxiliary electrode means and the remote ground electrode and a second amplifier circuit for passing an auxiliary current between the auxiliary electrode means and the pseudo-ground electrode; means responsive to potentials in the vicinity of the main electrode for developing resistivity signals representative of an effective focused current flow from the main electrode; first and second resistivity-signal amplifier circuits coupled to the last-mentioned means for translating the resistivity signals; indicating means having a first unit coupled to the first resistivity-signal amplifier circuit and a second unit coupled to the second resistivity-signal amplifier circuit; and circuit means for supplying blanking signals for disabling all of said first amplifier circuits during shallow penetration time intervals and for disabling all of said second amplifier circuits during separate deep penetration time intervals thereby to enable the second indicating unit to provide an indication of the formation resistivity near to the borehole and to enable the first indicating unit to provide an indication of the formation resistivity at a more remote distance from the borehole.

9. In apparatus for investigating earth formations traversed by a borehole, the combination comprising: an array of electrodes adapted for movement through the borehole and including a main electrode, auxiliary electrode means positioned adjacent the main electrode, and a pseudo-ground electrode electrically proximate to the other electrodes; a remote ground electrode substantially at electrical infinity with respect to said array; survey-current circuit means including a first amplifier circuit for passing a survey current between the main electrode and the remote ground electrode and a second amplifier circuit for passing a survey current between the main electrode and the pseudo-ground electrode; auxiliary-current circuit means including a first amplifier circuit for passing an auxiliary current between the auxiliary electrode means and the remote ground electrode and a second amplifier circuit for passing an auxiliary current between the auxiliary electrode means and the pseudo-ground electrode; potential monitoring means for providing indications of potential differences intermediate the main electrode and the auxiliary electrode means; feedback control means coupled to the potential monitoring means for regulating the amount of auxiliary current supplied by the auxiliary-current circuit means for maintaining a region of substantially zero potential difference intermediate the main electrode and the auxiliary electrode means; means for providing indications of the potentials in the vicinity of such zero potential differences, such potentials constituting desired resistivity signals; first and second resistivity-signal amplifier circuits coupled to the last-mentioned means for translating the resistivity signals; indicating means having a first unit coupled to the first resistivity-signal amplifier circuit and a second unit coupled to the second resistivity-signal amplifier circuit; and circuit means for supplying blanking signals for disabling all of said first amplifier circuits during shallow penetration time intervals and for disabling all of said second amplifier circuits during separate deep penetration time intervals thereby to enable the second indicating unit to provide an indication of the formation resistivity near to the borehole and to enable the first indicating unit to provide an indication of the formation resistivity at a more remote distance from the borehole.

10. In apparatus for investigating earth formations traversed by a borehole, the combination comprising: an array of electrodes adapted for movement through the borehole and including a main electrode, auxiliary electrode means positioned adjacent the main electrode, and a pseudo-ground electrode electrically proximate to the other electrodes; a remote ground electrode substantially at electrical infinity with respect to said array; survey-current circuit means including a first amplifier circuit for passing a survey current between the main electrode and the remote ground electrode and a second amplifier circuit for passing a survey current between the main electrode and the pseudo-ground electrode; auxiliary-current circuit means including a first amplifier circuit for passing a separately-measurable auxiliary current between the auxiliary electrode means and the remote ground electrode and a second amplifier circuit for passing the separately-measurable auxiliary current between the auxiliary electrode means and the pseudo-ground electrode; potential monitoring means for providing indications of potentials in the vicinity of the main electrode; computer means coupled to the potential monitoring means and having a first portion responsive to the potential indications resulting from the survey current and having a second portion responsive to the potential indications resulting from the separately-measurable auxiliary current for jointly developing desired resistivity signals; first and second resistivity-signal amplifier circuits coupled to the computer means for translating the resistivity signals; indicating means having a first unit coupled to the first resistivity-signal amplifier circuit and a second unit coupled to the second resistivity-signal amplifier circuit; and circuit means for supplying blanking signals for disabling all of said first amplifier circuits during shallow penetration time intervals and for disabling all of said second amplifier circuits during separate deep penetration time intervals thereby to enable the second indicating unit to provide an indication of the formation resistivity near to the borehole and to enable the first indicating unit to provide an indication of the formation resistivity at a more remote distance from the borehole.

11. In apparatus for investigating earth formations traversed by a borehole, the combination comprising: an array of electrodes adapted for movement through the borehole and including a main electrode, first and second auxiliary electrodes positioned adjacent the main electrode at different distances therefrom, and a pseudo-ground electrode electrically proximate to the other electrical; a remote ground electrode substantially at electrical infinity with respect to said array; survey-current circuit means including a first amplifier circuit for passing a survey current between the main electrode and the remote ground electrode and a second amplifier circuit for passing a survey current between the main electrode and the pseudo-ground electrode; auxiliary-current circuit means including a first amplifier circuit for passing an auxiliary current between the first auxiliary electrode and the remote ground electrode and a second amplifier circuit for passing an auxiliary current between the second auxiliary electrode and the pseudo-ground electrode; means responsive to potentials in the vicinity of the main electrode for developing resistivity signals representative of an effective focused current flow from the main electrode; first and second resistivity-signal amplifier circuits coupled to the last-mentioned means for translating the resistivity signals; indicating means having a first unit coupled to the first resistivity-signal amplifier circuit and a second unit coupled to the second resistivity-signal amplifier circuit; and circuit means for supplying blanking signals for disabling all of said first amplifier circuits during shallow penetration time intervals and for disabling all of said second amplifier circuits during separate deep penetration time intervals thereby to enable the second indicating unit to provide an indication of the formation resistivity near to the borehole and to enable the first indicating unit to provide an indication of the formation resistivity at a more remote distance from the borehole.

12. In apparatus for investigating earth formations traversed by a borehole, the combination comprising: an array of electrodes adapted for movement through the borehole and including two electrode means located in two spaced-apart regions and a pseudo-ground electrode electrically proximate thereto; a remote ground electrode substantially at electrical infinity with respect to said array; means for passing a survey current between the remote ground electrode and a location lying in the space interval defined by said two electrode means; means for passing an auxiliary current between two locations lying in said space interval; feedback control means coupled between a first of said two electrode means and the pseudo-ground electrode during shallow penetration time intervals and between this first electrode means and the remote ground electrode during separate deep penetration time intervals for regulating the amount of auxiliary current flow for maintaining a region of substantially zero potential difference intermediate said first electrode means and the respective one of said ground electrodes during the respective sets of time intervals; means coupled between the second of said two electrode means and the pseudo-ground electrode during the shallow penetration time intervals for providing shallow penetration resistivity signals and coupled between this second electrode means and the remote ground electrode during the deep penetration time intervals for providing deep penetration resistivity signals; and indicating means having a first unit responsive to the shallow penetration resistivity signals for providing an indication of the formation resistivity near to the borehole and having a second unit responsive to the deep penetration resistivity signals for providing an indication of the formation resistivity at a more remote distance from the borehole.

References Cited in the file of this patent
UNITED STATES PATENTS

| | | |
|---|---|---|
| 2,754,475 | Norelius | July 10, 1956 |
| 2,770,771 | Schuster | Nov. 13, 1956 |
| 2,779,912 | Waters | Jan. 29, 1957 |
| 2,782,364 | Shuler | Feb. 19, 1957 |

UNITED STATES PATENT OFFICE

CERTIFICATE OF CORRECTION

Patent No. 2,880,389                                        March 31, 1959

Maurice C. Ferre at al.

It is hereby certified that error appears in the printed specification of the above numbered patent requiring correction and that the said Letters Patent should read as corrected below.

Column 4, line 51, for "region", second occurrence, read — regions —; column 9, line 38, for "apperent" read — apparent —; line 48, for "ohter" read — other —; column 13, lines 54 and 55, for "electrical" read — electrodes —.

Signed and sealed this 21st day of July 1959.

(SEAL)

Attest:

KARL H. AXLINE
Attesting Officer

ROBERT C. WATSON
Commissioner of Patents